(12) United States Patent
Williams et al.

(10) Patent No.: US 9,249,036 B2
(45) Date of Patent: Feb. 2, 2016

(54) MODULAR SMART BIOFEEDING DEVICE

(71) Applicant: In-Pipe Technology Company, Inc., Wood Dale, IL (US)

(72) Inventors: John Williams, Wood Dale, IL (US); Richard Schici, Lombard, IL (US); Andrew Newbold, Norfolk, VA (US)

(73) Assignee: In-Pipe Technology Company, Inc., Wood Dale, IL (US)

( * ) Notice: Subject to any disclaimer, the term of this patent is extended or adjusted under 35 U.S.C. 154(b) by 289 days.

(21) Appl. No.: 13/739,916

(22) Filed: Jan. 11, 2013

(65) Prior Publication Data

US 2013/0248428 A1    Sep. 26, 2013

Related U.S. Application Data

(60) Provisional application No. 61/585,288, filed on Jan. 11, 2012.

(51) Int. Cl.
*C02F 3/00* (2006.01)
*B67D 7/84* (2010.01)
(Continued)

(52) U.S. Cl.
CPC .................. *C02F 3/00* (2013.01); *B01F 13/003* (2013.01); *B01F 13/0016* (2013.01);
(Continued)

(58) Field of Classification Search
CPC .......... C02F 1/008; C02F 1/685; C02F 1/686; C02F 3/006; C02F 3/348; C02F 2201/007; C02F 2201/008; C02F 2201/009; C02F 2203/006; C02F 2203/008; C02F 2203/36; C02F 2203/44; C02F 2209/005; C02F 2209/008; C02F 2307/08; C02F 3/00; C02F 2201/002; C02F 2201/004; B01F 15/00129;
B01F 15/00402; B01F 15/00409; B01F 15/00415; C12M 1/36; C12M 23/44; C12M 23/46; C12M 23/50; C12M 29/00; C12M 41/02; C12M 41/48; B67D 3/00; B67D 3/008; B67D 3/0083; B67D 3/0083; B67D 7/00; B65D 83/00; B65D 88/54; B65D 90/00; B65D 90/12; B65D 90/22; B65D 90/24; B65D 90/50; B65D 90/0053
USPC ............. 210/96.1, 138, 139, 143, 198.1, 199, 210/614, 631, 739; 422/105, 108, 116, 261, 422/268; 137/87.05, 88, 93; 366/150.1, 366/151.1, 152.1, 182.1; 239/52, 145.1, 239/160, 173, 180, 185.1, 325, 372, 373
See application file for complete search history.

(56) References Cited

U.S. PATENT DOCUMENTS

D227,886 S     7/1973   Martinez
3,781,624 A *  12/1973  Tullis ............................ 318/482
(Continued)

FOREIGN PATENT DOCUMENTS

BE    1014953       7/2004
CN    101531978     4/2009
KR    20030071604   9/2003

OTHER PUBLICATIONS

Flores, J. et al, "An intelligent system for distributed control of an anaerobic wastewater treatment process", Engineering Applications of Artificial Inetlligence, 13:4:485-494, DOI:10.1016/S0952-1976(00)00015-4, (Aug. 2000).
(Continued)

*Primary Examiner* — Joseph Drodge
(74) *Attorney, Agent, or Firm* — McHale & Slavin, P.A.

(57) ABSTRACT

The instant invention describes a device and system for dispensing microbial solutions into a wastewater treatment environment. The device contains one or more removable modules that provides the user with the capability of quickly and easily removing one or more of the modules without the need for replacing or removing the entire unit. The modules are preferably designed to hold bags filled with a microbial solution. The bags are fluidly connected to a pump which dispenses the solution to a predetermined location.

24 Claims, 12 Drawing Sheets

(51) Int. Cl.
    *B01F 15/00*     (2006.01)
    *B01F 13/00*     (2006.01)
    *B67D 3/00*     (2006.01)
    *C02F 3/34*     (2006.01)
    *C02F 1/68*     (2006.01)

(52) U.S. Cl.
    CPC ......... *B01F 15/00662* (2013.01); *B67D 3/008* (2013.01); *B67D 7/84* (2013.01); *C02F 3/348* (2013.01); *C02F 1/686* (2013.01); *C02F 2201/007* (2013.01); *C02F 2201/009* (2013.01); *C02F 2209/008* (2013.01); *C02F 2307/08* (2013.01); *Y02W 10/37* (2015.05)

(56) References Cited

U.S. PATENT DOCUMENTS

| | | | |
|---|---|---|---|
| 4,125,020 A | 11/1978 | McClure | |
| 4,513,885 A * | 4/1985 | Hogan | 222/95 |
| 4,670,149 A | 6/1987 | Francis | |
| 4,810,385 A | 3/1989 | Hater et al. | |
| D323,017 S | 1/1992 | Bernstein | |
| 5,171,687 A | 12/1992 | Moller et al. | |
| D344,322 S | 2/1994 | Kasner et al. | |
| 5,287,884 A | 2/1994 | Cohen | |
| 5,341,690 A | 8/1994 | Dawson et al. | |
| 5,466,604 A | 11/1995 | Yang et al. | |
| 5,577,558 A | 11/1996 | Abdul et al. | |
| 5,578,211 A | 11/1996 | Dickerson | |
| 5,683,575 A * | 11/1997 | Yates et al. | 210/138 |
| 5,788,841 A | 8/1998 | Dickerson | |
| 5,824,221 A | 10/1998 | Thuer et al. | |
| 5,885,446 A | 3/1999 | McGrew, Jr. | |
| 5,935,843 A | 8/1999 | Glendening et al. | |
| 5,954,451 A | 9/1999 | Presby | |
| 6,015,496 A | 1/2000 | Khudenko | |
| 6,284,138 B1 | 9/2001 | Mast | |
| 6,335,191 B1 | 1/2002 | Kiplinger et al. | |
| 6,402,941 B1 | 6/2002 | Lucido et al. | |
| 6,428,701 B1 | 8/2002 | Mullennix et al. | |
| 6,669,839 B2 | 12/2003 | Tipton et al. | |
| 6,712,965 B1 | 3/2004 | Aalto et al. | |
| 6,878,279 B2 | 4/2005 | Davis et al. | |
| D504,935 S | 5/2005 | Taneike et al. | |
| 7,002,481 B1 | 2/2006 | Crane et al. | |
| 7,022,234 B2 | 4/2006 | Shaffer et al. | |
| 7,166,211 B1 | 1/2007 | Boyd | |
| D548,815 S | 8/2007 | Frisell | |
| D557,762 S | 12/2007 | Novotny et al. | |
| 7,381,333 B1 | 6/2008 | Rainer | |
| 7,431,832 B2 | 10/2008 | Plishker et al. | |
| D590,044 S | 4/2009 | Cho | |
| D596,702 S | 7/2009 | Chen | |
| D618,301 S | 6/2010 | Cho | |
| D644,711 S | 9/2011 | Kassir et al. | |
| 2004/0011736 A1 * | 1/2004 | Ishikawa et al. | 210/614 |
| 2004/0226869 A1 * | 11/2004 | McClure et al. | 210/163 |
| 2005/0032032 A1 * | 2/2005 | Pearce et al. | 435/3 |
| 2005/0054086 A1 * | 3/2005 | Ophardt | 435/296.1 |
| 2009/0130740 A1 * | 5/2009 | Ophardt | 435/252.1 |
| 2009/0277832 A1 | 11/2009 | Fujishima | |
| 2010/0051641 A1 * | 3/2010 | Sassoon | 222/52 |
| 2011/0207111 A1 * | 8/2011 | Bradley | 435/3 |

OTHER PUBLICATIONS

Ba Dieu, "Application of the SCADA system in wastewater treatment plants", ISA Transactions, 40:3:267-281, ISSN 0019-0578, DOI: 10.1016/S0019-0578(00)00053-7, (Jul. 2001).

Green, F. et al, "Advanced integrated wastewater pond systems for nitrogen removal", Was. Sci. Tech., 33:7:207-217, Internet article retrieved from http://esd.lbl.gov/ESD_staff/X-oswald/pdf/96_N_Removal_in_AIWPS.pdf, (1996).

Weber, Jr, W. et al, "Processes for advanced treatment of water", Water Science and Technology, 40:4-5:9-11, ISSN 0273-1223, DOI: 10.1016/S0273-1223(99)00480-1, (1999).

Lambert, S. et al, "Grids in control of anaerobic wastewater treatment plants: Leveraging the knowledge", Simulation Modeling Practice and Theory, 16"10:1546-1560, ISSN 1569-190X, DOI: simpat.2007.11.022, (Nov. 2008).

* cited by examiner

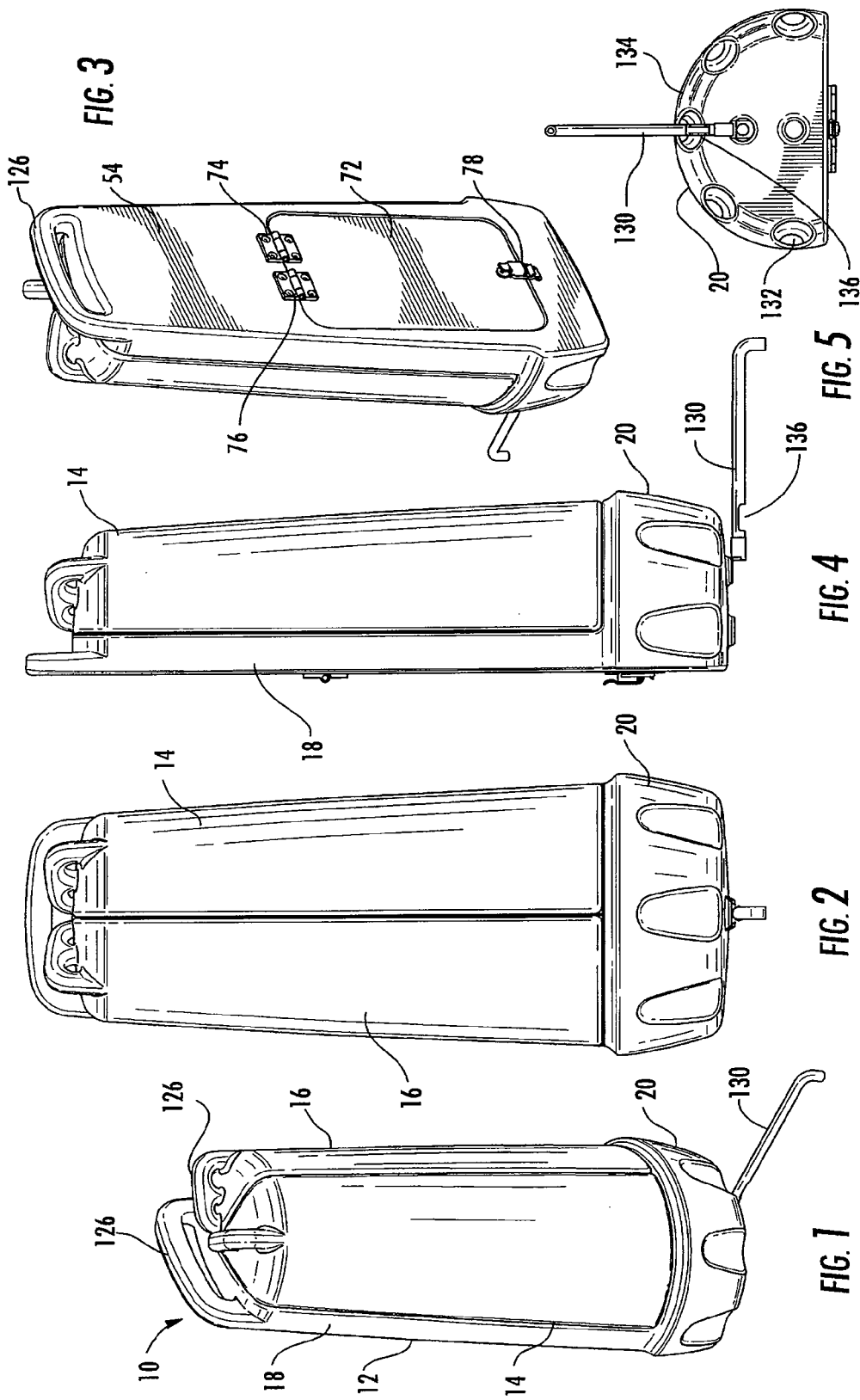

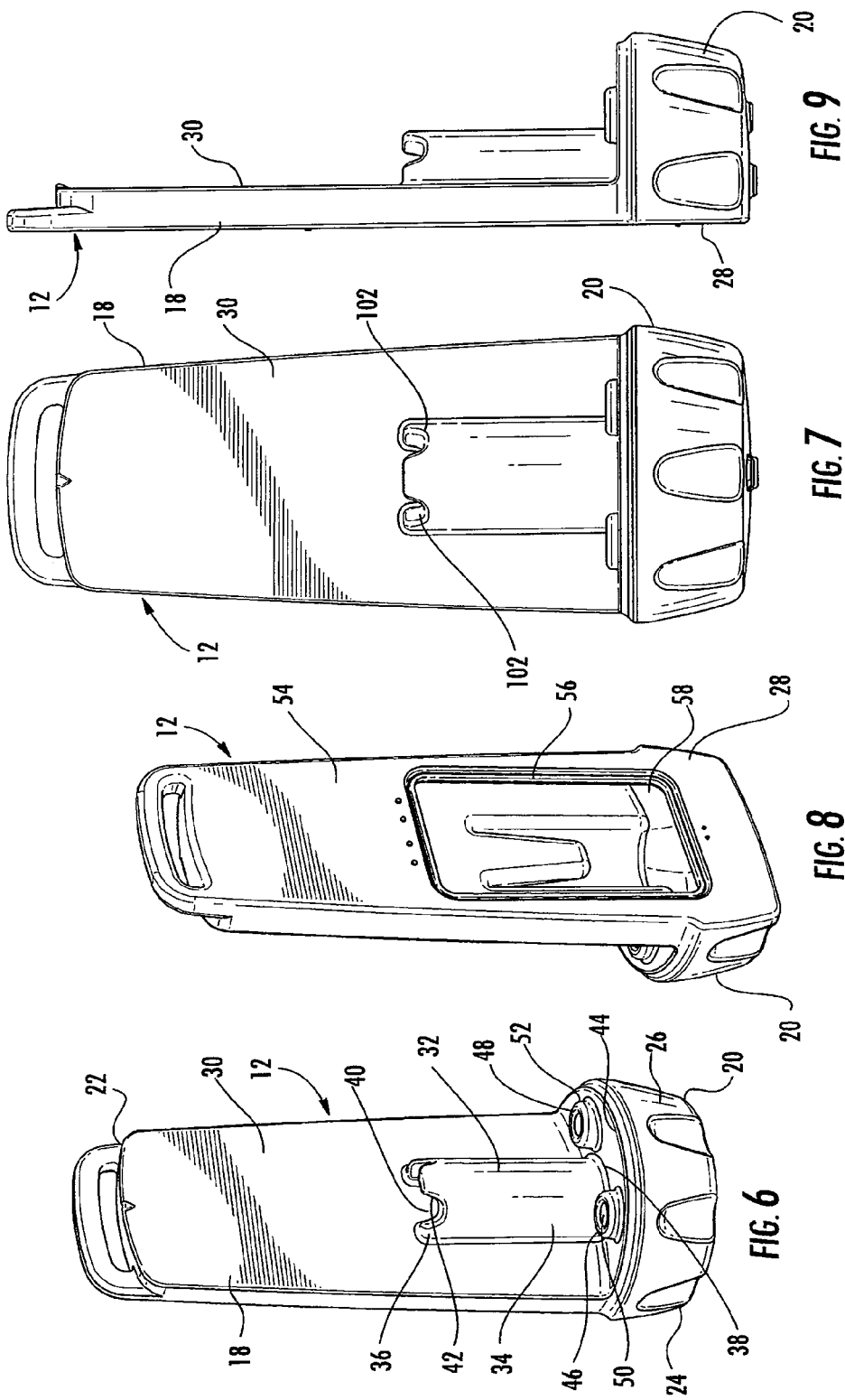

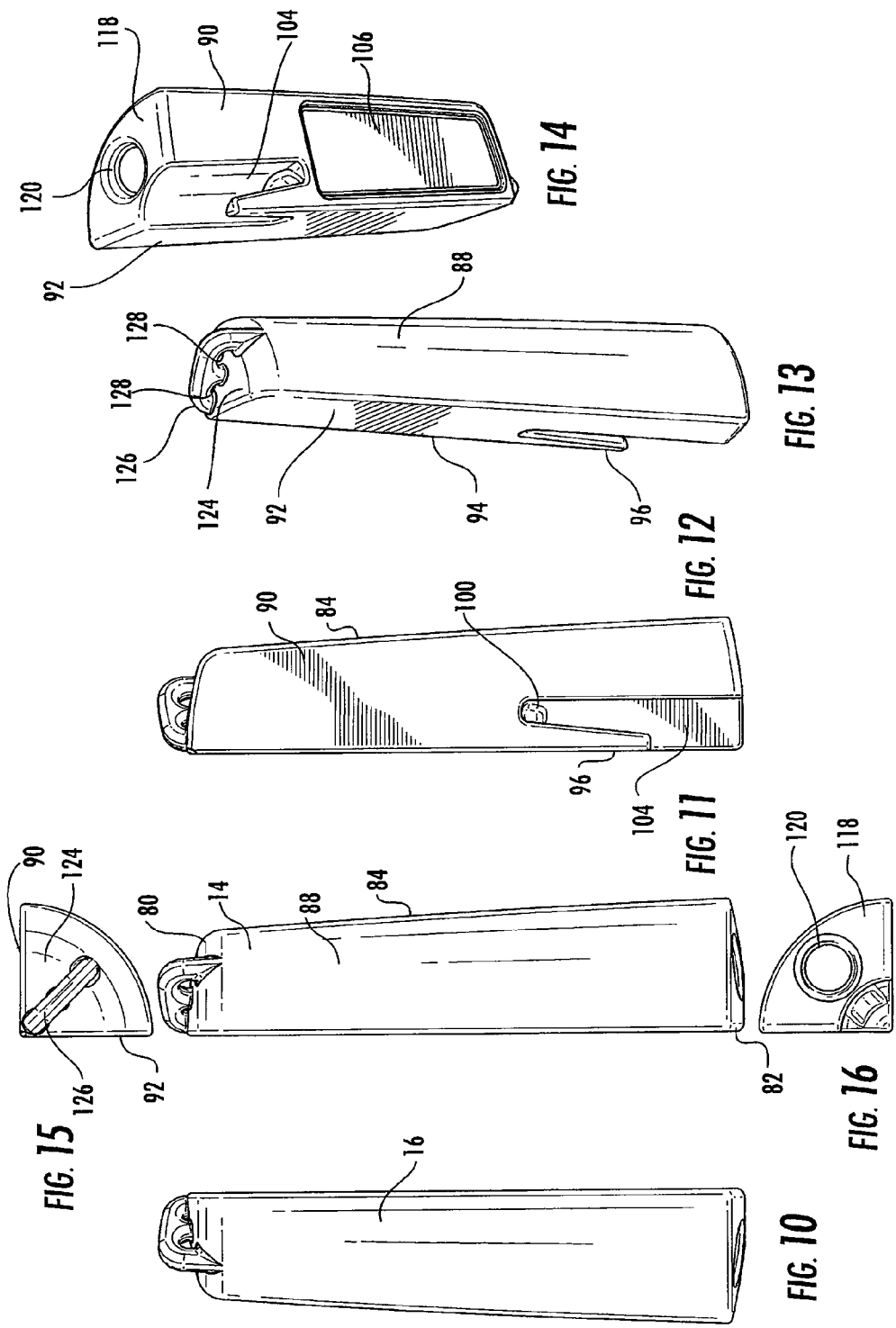

MODULAR SMART BIOFEEDING DEVICE

PRIORITY CLAIM

In accordance with 37 C.F.R. 1.76, a claim of priority is included in an Application Data Sheet filed concurrently herewith. Accordingly, the present invention claims priority under 35 U.S.C. §119(e), 120, 121, and/or 365(c) to U.S. Provisional Application No. 61/585,288, entitled "A Modular Smart Biofeeding Device", filed Jan. 11, 2012. The contents of which the above referenced application is incorporated herein by reference.

FIELD OF THE INVENTION

This invention relates to wastewater treatment; and more particularly to a modular device and system for dispensing biological materials within a wastewater system environment.

BACKGROUND OF THE INVENTION

Removal and treatment of wastewater is a major task for local governments. In the early 20th century, municipalities began to adopt biological methods that now form the basis by which wastewater treatment plants function. Microorganisms act to catalyze the oxidation of biodegradable organics and other contaminants generating innocuous by-products such as carbon dioxide, water and biomass (sludge). In these systems, bacteria grow and divide, producing biosolids and clean water effluent. Today, this metabolism occurs in wastewater treatment plants which have the limits of size, retention time, processing capacity, and municipal budgets.

Technology exists, such as that described in U.S. Pat. Nos. 5,578,211 and 5,788,841 and commercialized by In-Pipe Technology Company, Inc. (Wheaton, Ill.) to effectively enhance the fundamental wastewater treatment process by starting treatment at strategic locations throughout the sewer collection system. Miles of sewer pipe are transferred into an active part of the wastewater treatment process, optimizing the entire infrastructure. This improves operating economics without additional capital expenditure. Since it uses natural, biological methods that work with the treatment plant's own processes, such technology is an environmentally and economically sound sustainable solution. However, maintaining bacteria concentrations at proper levels is a significant cost associated with systems employing the '211 and '841 patents.

Thus, what is needed in the art is a device that dispenses biological solutions into a wastewater treatment environment which reduces overall costs associated with delivery of the microbial agents into the system.

SUMMARY OF THE INVENTION

The instant invention describes a device and system for dispensing biological solutions into a wastewater treatment system containing a biological dispensing unit located within the wastewater environment, such as a sewer system, remote programming devices, and a main control device located remotely from the dispensing unit. The dispensing unit device contains one or more removable modules that provide the user with the capability of quickly and easily removing biological solutions stored within, without the need for replacing or removing the entire unit. The modules are preferably designed to hold bags filled with biological, i.e. microbial, solutions. The bags are fluidly connected to at least one material delivery unit which includes a pump to dispense the solution to a predetermined location through one or more tubing.

Accordingly, it is a primary objective of the instant invention to provide a modular smart device and system for dispensing biological solutions into a wastewater treatment environment.

It is a further objective of the instant invention to provide a system using a modular smart device for dispensing biological solutions into a wastewater treatment environment.

It is yet another objective of the instant invention to provide a modular smart biofeeder device and system which can be controlled remotely.

It is a still further objective of the instant invention to provide a modular smart biofeeder device and system which operates with wireless technology.

It is a further objective of the instant invention to provide a modular smart biofeeder device and system which minimizes costs associated with supplying a bacterial solution to a particular environment.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 1 is a perspective view of an illustrative embodiment of the modular smart biofeeder device in accordance with the instant invention;

FIG. 2 is a front perspective view of the modular smart biofeeder device in accordance with the instant invention;

FIG. 3 is a rear perspective view of the modular smart biofeeder device in accordance with the instant invention;

FIG. 4 is a side perspective view of the modular smart biofeeder device in accordance with the instant invention;

FIG. 5 is a bottom view of the modular smart biofeeder device in accordance with the instant invention;

FIG. 6 is a perspective view of the main unit of the modular smart biofeeder device illustrated in FIG. 1 with the modules removed;

FIG. 7 is a front perspective view of the main unit of the modular smart biofeeder device with the modules removed;

FIG. 8 is a rear perspective view of the main unit of the modular smart biofeeder device with the modules removed;

FIG. 9 is a side perspective view of the main unit of the modular smart biofeeder device with the modules removed;

FIG. 10 is a front perspective view of a module;

FIG. 11 is a perspective view of the second module;

FIG. 12 is a left side perspective view of the second module shown in FIG. 11;

FIG. 13 is a right side perspective view of the second module shown in FIG. 11;

FIG. 14 is a bottom perspective view of the second module shown in FIG. 11;

FIG. 15 is a top view of the second module shown in FIG. 11;

FIG. 16 is a bottom view of the second module shown in FIG. 11;

DETAILED DESCRIPTION OF THE INVENTION

Figure 17:
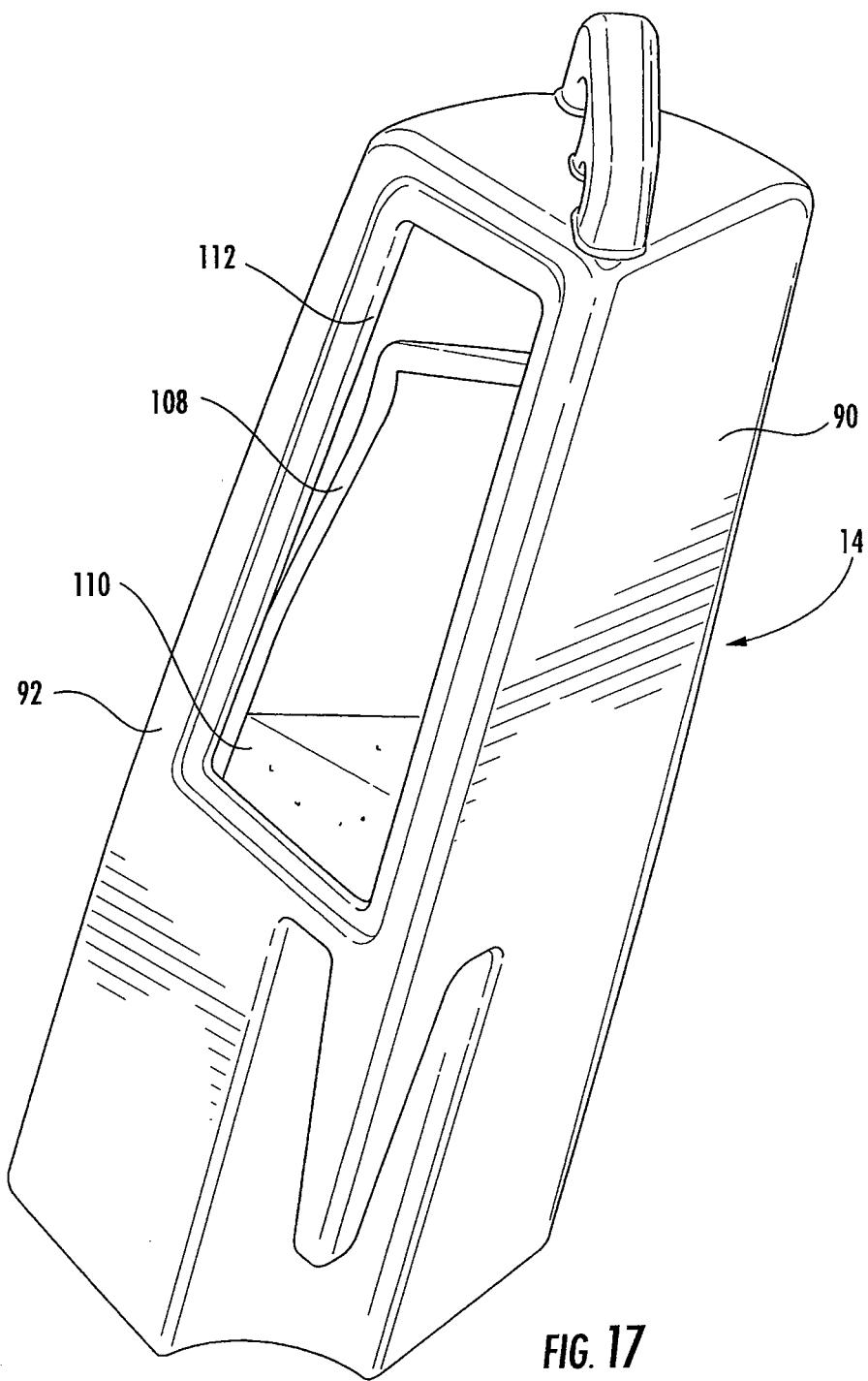
FIG. 17 is a perspective view of the module with a bio-solution bag stored within.

Referring to FIGS. 1-5, in which similar reference characters denote similar elements throughout the several views, an illustrative example of a modular smart biofeeder device 10 is illustrated. The biofeeder device 10 comprises a main dispensing unit 12 and one or more removable modules 14 and 16. While the biofeeder device 10 is described as having two removable modules, additional modules may be utilized as well. The main dispensing unit 12 comprises a vertical support structure 18 and a base 20. The support structure 18 and the base 20 are preferably integrally constructed as a single unit, but may be constructed as individual units connected or secured together using techniques known in the art. The one or more removable modules 14 and 16 are constructed and arranged to be securable to the support structure 18 and the base 20. Each module is preferably made of a durable plastic material.

Referring to FIGS. 6-9, the biofeeder device 10 is illustrated with the removable modules 14 and 16 detached from the main dispensing unit 12. The support structure 18 is shown having a generally rectangular shape; however, such shape is not intended to be limiting as the support structure 18 can take on other shapes without departing from the spirit of the invention. The top end 22 of the support structure 18 forms the top end of the main dispensing unit 12. The base 20, which is attached to the bottom of the support structure 18, forms the bottom end 24 of the main dispensing unit 12. The base 20 contains a partially cylindrical portion 26 and a planer portion 28, see FIGS. 8 and 9. The interior surface 30 of the support structure 18 is generally planer and allows for a portion of the modules 14 and 16 to abut and rest flush with the support structure 18. The interior surface 30 contains a first module securing member 32, illustrated herein as a partially cylindrical structure 34. The partially cylindrical structure 34 contains a first end 36 and a second end 38. The first end 36 contains opening 40 which exposes an interior cavity 42 therein. The second end 38 is closed and rests on the upper surface 44 of the base 20 at or near where the support structure 18 intersects with the base portion 20. The length and width of the partially cylindrical structure 34 is preferably sized and shaped to accommodate a portion of the removable module 14 or 16 to prevent lateral, or side-to-side, movement of the modules away from or off the main unit 12.

Positioned on the upper surface 44 of the base 20 is a second module securing member, illustrated herein as cylindrically shaped plug members 46 and 48. Each of the plug members 46 and 48 is constructed and arranged to provide secured mating with a portion of the removable modules 14 and 16. The plug members 46 and 48 may be solid, or alternatively may contain an opening 50 which exposes an internal cavity. The plug members 46 and 48 may contain a rimmed or lipped outer surface 52 to provide a friction or snap fit connection to secure the removable module 14 or 16 to the base 20, thereby preventing both lateral movement and horizontal movement. The rimmed or lipped outer surface 52 is constructed and arranged to prevent the modules from upward and/or side-to-side movement while allowing the modules to be detached under a sufficient predetermined force.

Figure 28:
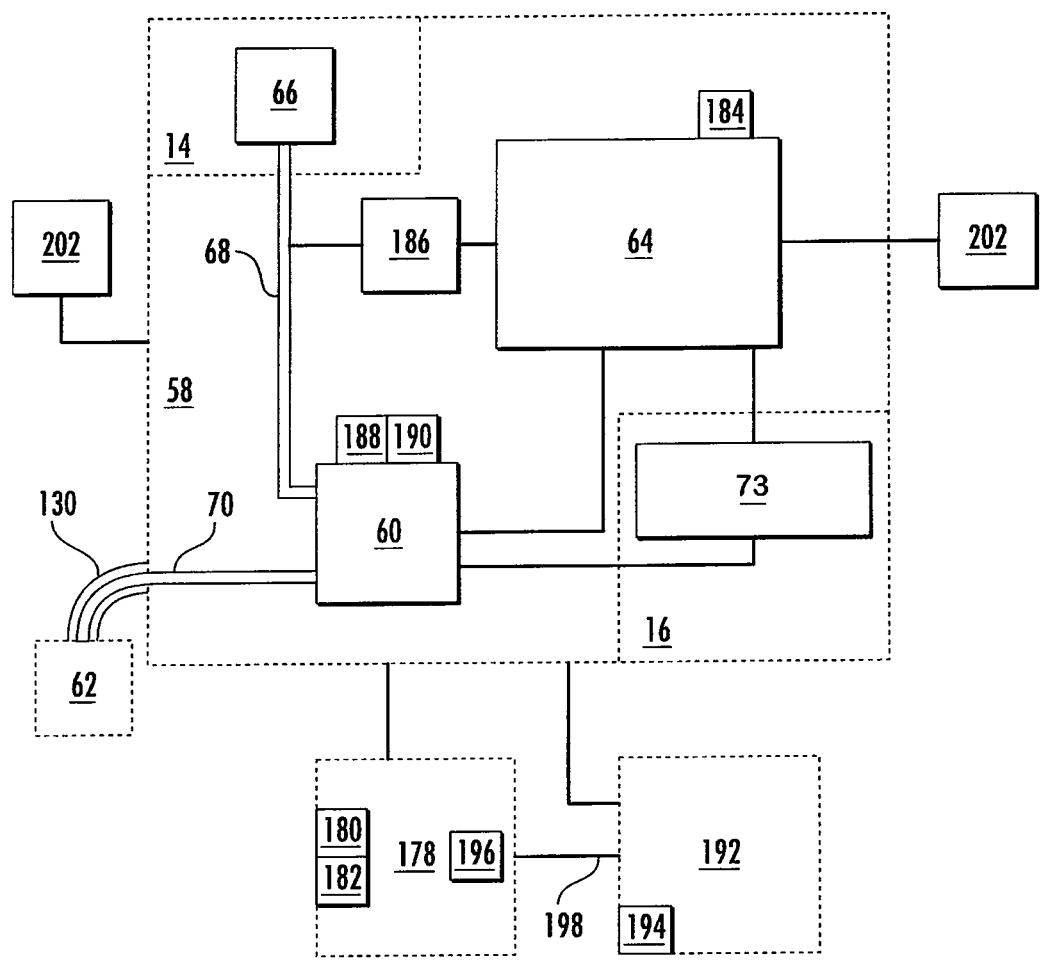
FIG. 28 is a block diagram illustrating the components of the system in accordance with the instant invention.

The back surface 54 of the main dispensing unit 12 contains opening 56 which exposes an interior compartment 58. The interior compartment 58 is constructed and arranged to hold a variety of hardware to provide the device with fluid dispensing functionality. FIG. 28 is a diagrammatic representation of the system in accordance with the instant invention showing several components of a preferred embodiment of the hardware contained within the interior compartment 58. A pump 60 for dispensing microbial solutions to a wastewater environment 62 is controlled and operated by a control unit, such as a microcomputer 64 or printed circuit board. The control unit is constructed and arranged to operatively control the functioning of the device. For example, the control unit can be programmed to deliver predetermined concentrations of a biological solution at a predetermined rate. Additionally, the control unit may contain or be coupled to a programmable clock for dispensing of the type of bacterial solution and or concentrations based on predetermined factors including, but not limited to, time of year, month, or week, diurnal cycles, or seasonal changes. The control unit may also be adapted to dispense microbial loads based on the type of wastewater generated in the wastewater system. The pump 60 is fluidly connected to a solution supply 66 located outside of the interior compartment 58 (preferably within the removable module 14 through a tubing 68 and dispensed to the wastewater environment 62 through a second tubing 70. The microcomputer 64 and the pump 60 are powered by a power source 73. Preferably, the power source is located outside of the interior compartment 58, such as but not limited to, within the module 16. In this configuration, the device utilizes independent compartments which can be removed and replaced without the need for disrupting other components of the device, such as the other module 14. Each of the components located in the interior compartment 58 is accessible through a door panel 72, see FIG. 3. The door panel is hingedly connected to the back surface 54 through hinges 74 and 76 to allow the user easy and quick access to the interior compartment 58. Maintaining the door panel 72 in a closed position protects the internal components from the external environment. The door panel 72 may be secured to the base portion 20 through a securing member 78, such as a locking clasp or other securing means known to one of skill in the art.

Referring to FIGS. 10-16, the removable modules 14 and 16 are shown. Both of the removable modules 14 and 16 are preferably constructed and arranged in the same way. Accordingly, only the removable module 14 is described in detail. However, each of the elements described for removable module 14 is applicable to the removable module 16. The removable module 14 contains a first end 80, a second end 82, and a main body 84 extending there between, see FIG. 11. The front surface 88 is partially rounded and arranged to face away from the interior surface 30 of the main dispensing unit 12. Two generally planar interior surfaces 90 and 92, see FIGS. 12 and 15, converge along the longitudinal axis 94 (FIG. 13) to form the module's back surface. Surface 90 is constructed and arranged to align with or contact a portion of the interior surface 30 of the main dispensing unit 12. Surface 92 is constructed and arranged to align with and/or contact a corresponding interior surface of the adjacent removable module 16. Preferably aligned with or extending from the longitudinal axis 94 is a finger-like protrusion 96 constructed and arranged to be coupleable to the first removable module securing member 32. To secure the removable module 14 to the main dispensing unit 12, the finger-like extension 96 is inserted into the opening 40 of the first end 36 of the cylindrical structure 34 and into the interior cavity 42. The curved portion 100 of the removable module 14, see FIG. 12, is designed to align with the curvature 102 (FIG. 7) along the first end 36 of the cylindrical structure 34. The length and width of the partially cylindrical structure 34 is preferably sized and shaped to accommodate a portion of the removable module 14 or 16 to prevent lateral movement away from or off the main unit 12. Once inserted within, all or a portion of the first removable module securing member 32 is located within a cut out portion 104 (FIG. 14) positioned within the back surface of the removable module 14.

The main body 84 of the removable module 14 contains at least one internal compartment 106, see FIG. 14 or FIG. 17, which is constructed and arranged to hold one or more objects. Preferably, the internal compartment 106 contains a bag 108, similar to a plastic medical style intravenous bag, which contains a solution 110, such as a microbial solution of one or more bacteria species, to be dispensed, see FIG. 17. The at least one internal compartment 106 may contain a window, made of glass, or clear plastic, positioned on the internal surface 90 or 92 to provide visualization of the contents within. Alternatively, no window or viewing mechanisms is provided. While the preferred embodiment includes the use of a bio-solution bag, the solution 110 may be directly placed within the internal compartment 106 without the use of a bag. The bag 108 may be inserted or removed through the use of a panel door (not shown) or through the use of a removable top or bottom portion (not shown) so that the user can unscrew or pop off the top to place the bio-solution bag 108 within the interior.

Figure 18:
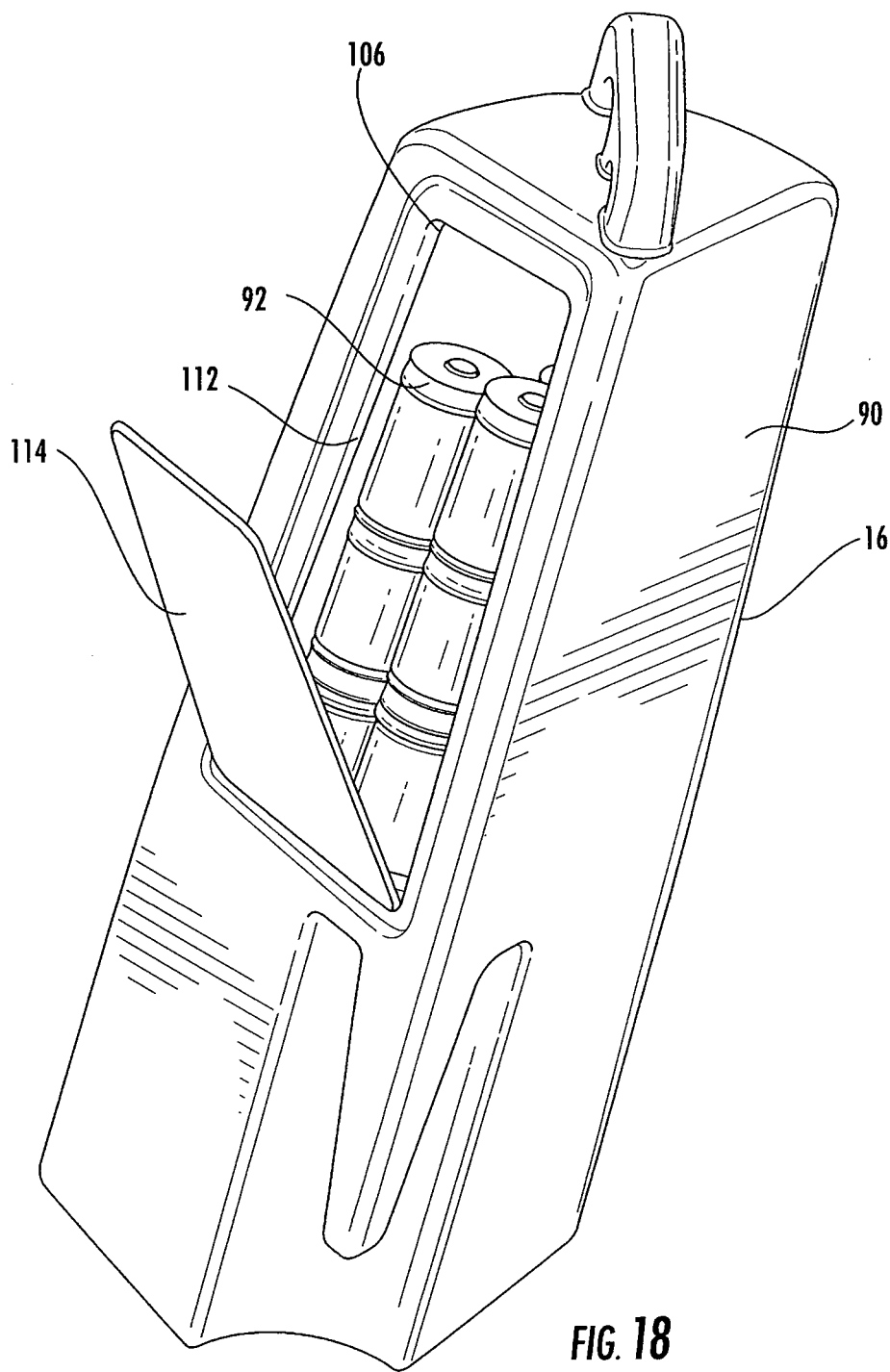
FIG. 18 is a perspective view of the module with a plurality of batteries stored within.

FIG. 18 illustrates the removable module 16 containing a power source. The power source, illustrated herein as a plurality of batteries 112, is stored within the internal compartment 106. The removable module may be constructed such that the power source is rechargeable, whereby plugging the unit into an electrical outlet may recharge the batteries or provide the necessary power to run the unit. Moreover, attaching the module 16 to the base unit 20 provides electrical connection to power one or all of the hardware. Alternatively, the batteries 112 may be disposable batteries. A hinged panel 114 secures the batteries within the internal compartment 106 and provides a mechanism for easy access.

Referring to FIGS. 14 and 16, the bottom surface 118 of the removable module 14 contains a module securing member receiving element 120. The module securing member receiving element 120, illustrated herein as a circular receptacle containing an opening 122 is sized and shaped to receive plug members 46 or 48. The module securing member receiving element 120 may be stepped to provide a better securing means.

Referring to FIGS. 13 and 15, the top surface 124 of the removable module 14 contains a retrieving or gripping member, illustrated herein as a handle 126. The retrieving member may contain one or more openings 128 to allow a device to be inserted within and secured there to. In addition to the retrieving member 126 of the removable modules 14 or 16, the main dispensing unit 12 also contains a retrieving or griping member, or handle 126 placed at the upper end, see FIG. 1, to allow for handling and placement of the biofeeder 10 to an area.

Figure 19:
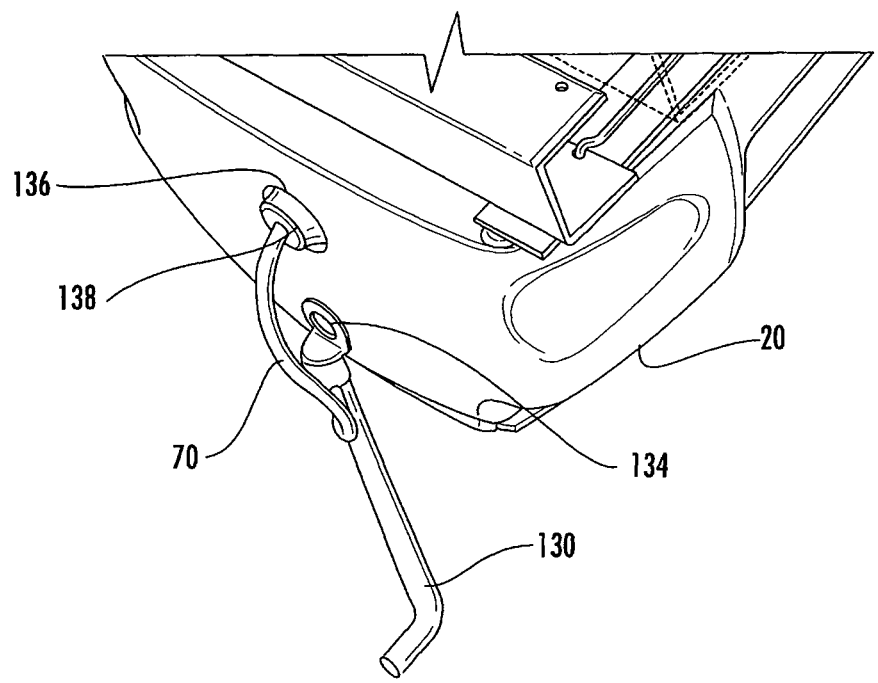
FIG. 19 is a partial view of the bottom of the base, illustrating the attachment of a dispensing bar.
Figure 22:
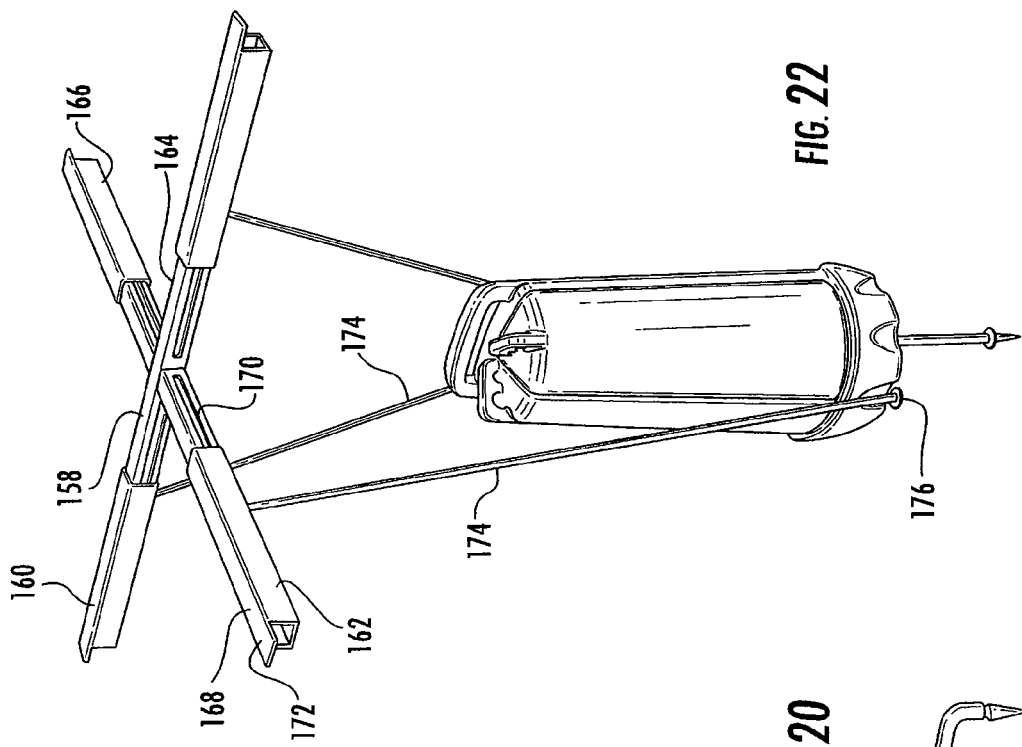
FIG. 22 is a perspective view of the biofeeder device with an alternative embodiment of the attachment structure.

Referring back to FIGS. 5 and 19, the base 20 contains a dispensing bar 130 attached to the surface 132 through a securing means, such as but not limited to a screw 134. The dispensing bar 130 is sized and shaped to receive and hold the dispensing tube or drip line 70 which is fluidly connected to the pump 60. A cut out portion 136 allows the dispensing tube 70, which is extendable through the cut out portion 136, see FIG. 19, to be placed within the dispensing bar 130. The opening 136 preferably contains a mechanism to prevent liquids from entering or exiting, such as a stopper 138, a membrane (not illustrated), or other means known to one of skill in the art.

Figure 20:
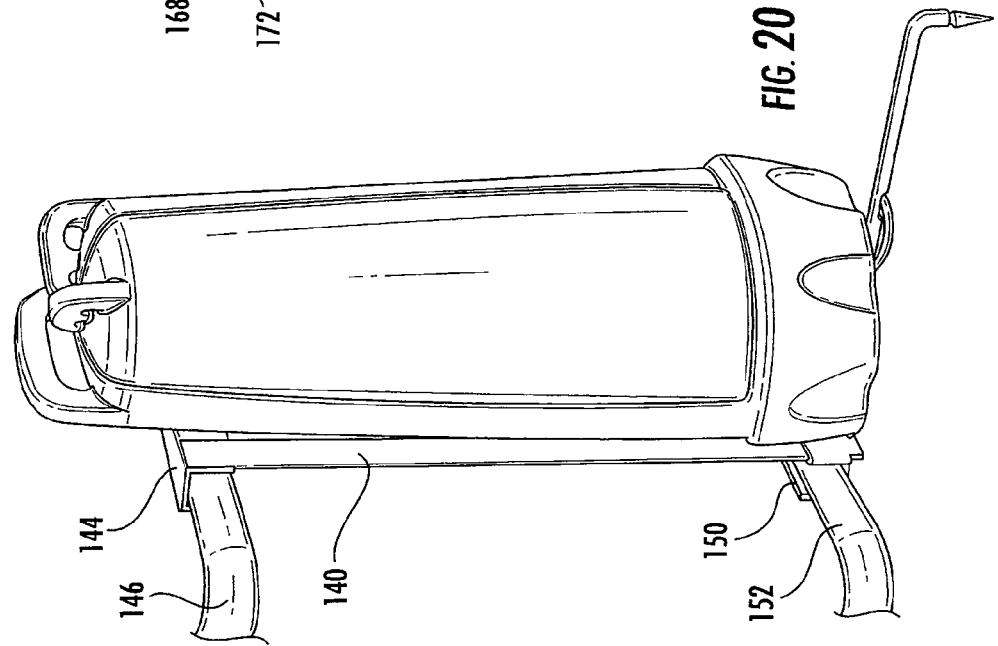
FIG. 20 is a front perspective view of the biofeeder device with an illustrative embodiment of an attachment structure.
Figure 21:
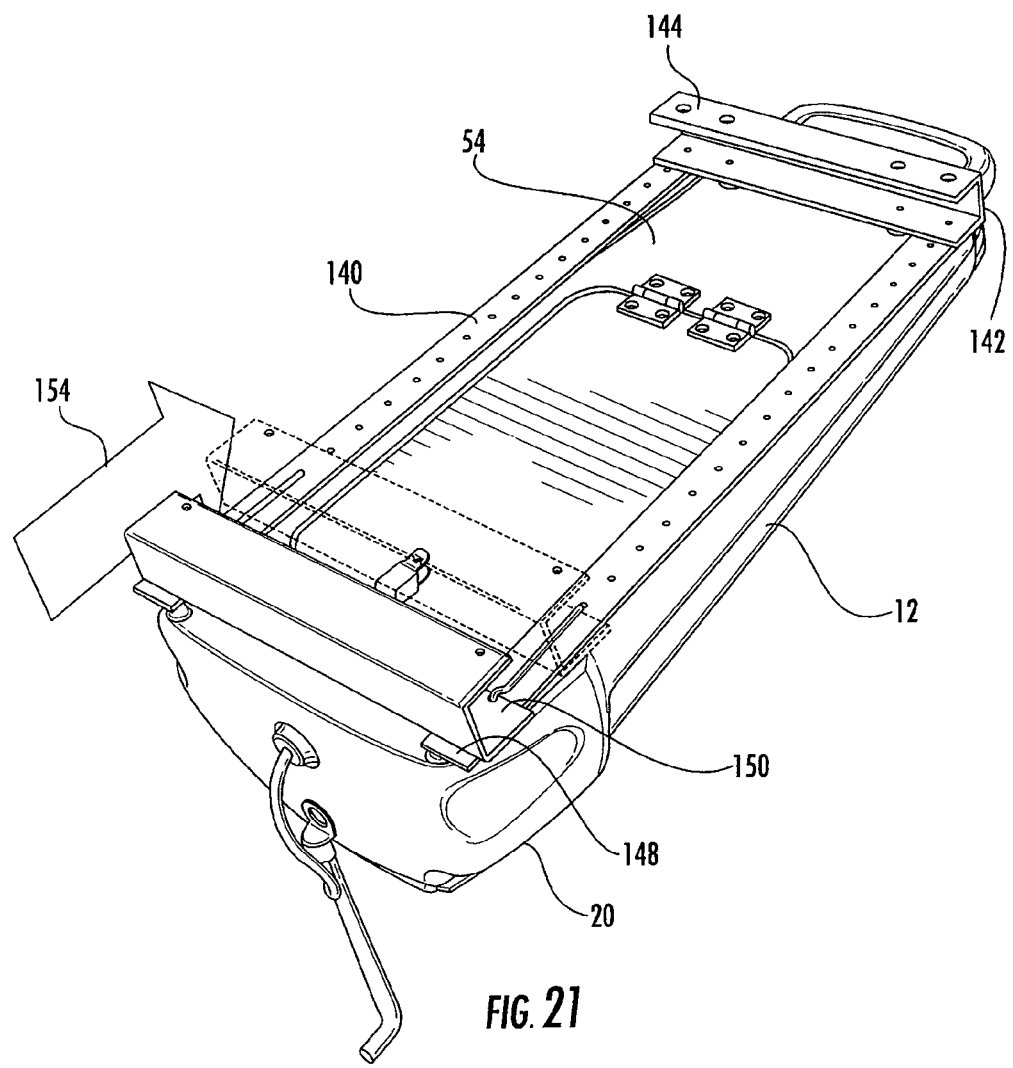
FIG. 21 is a rear perspective view of an attachment structure shown in FIG. 20.
Figure 23:
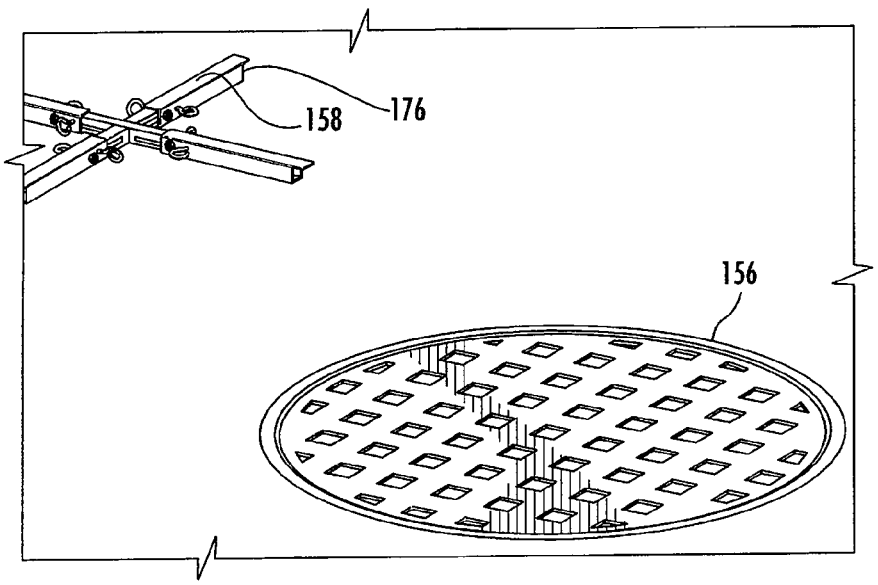
FIG. 23 illustrates the attachment structure shown in FIG. 22 prior to attachment to a manhole.
Figure 24:
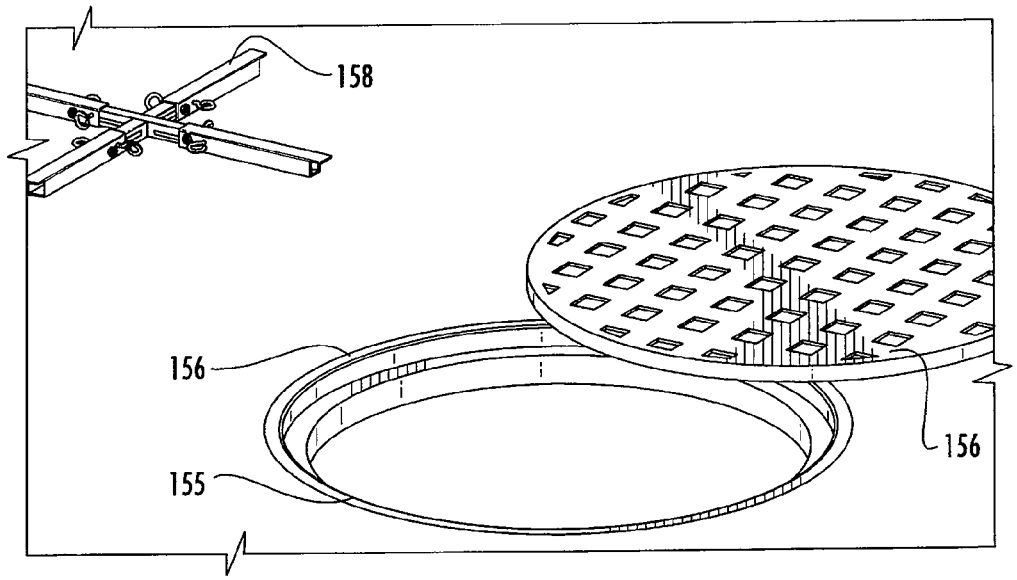
FIG. 24 illustrates the attachment structure shown in FIG. 23 being extended, just prior to attachment to the manhole.
Figure 25:
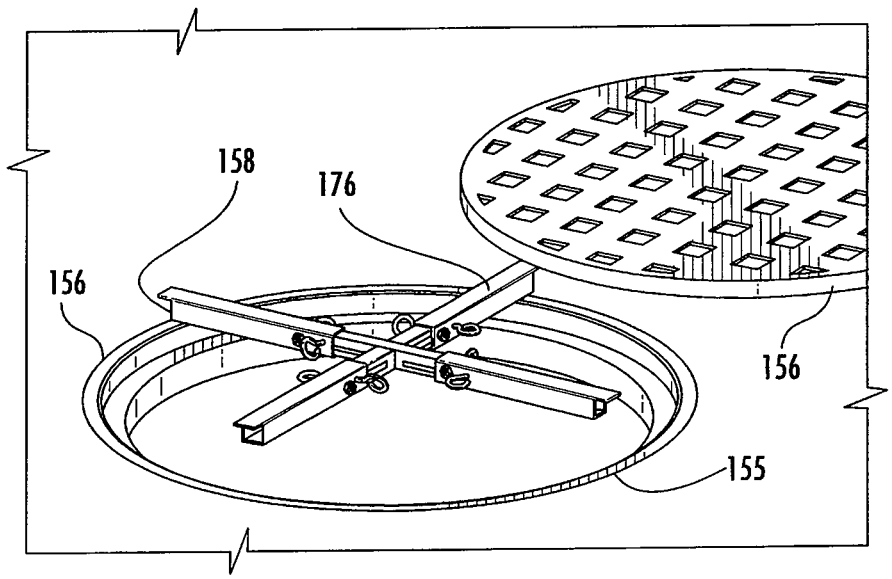
FIG. 25 illustrates the extended attachment structure shown in FIG. 24 being placed over the manhole.
Figure 26:
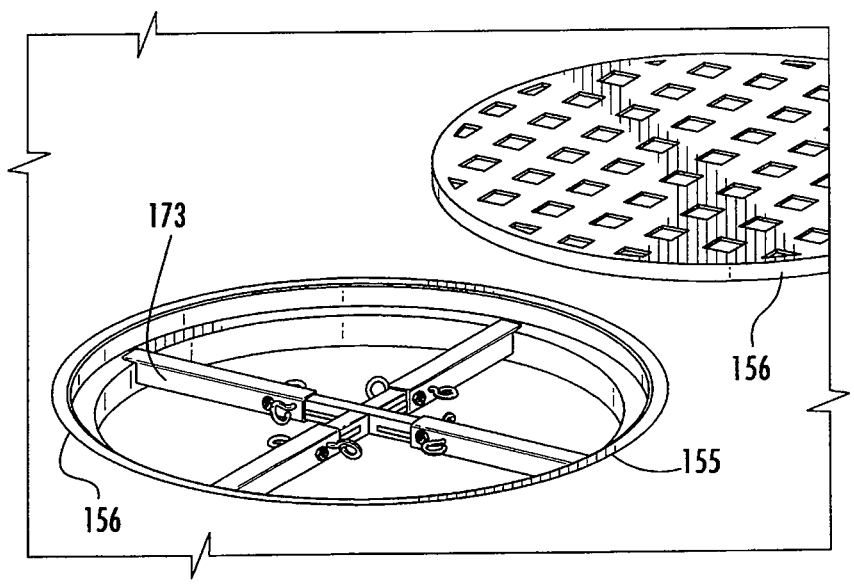
FIG. 26 illustrates the attachment structure shown in FIG. 25 being attached to the manhole.

By providing individual modules 14 or 16, the biofeeder device 10 is designed to be placed within a particular environment and remain in place over an extended period of time. When the contents of the modules have been depleted, the user retrieves the module from the main unit 12, removes its content, and replaces it with new materials. The module is then secured to the main unit 12. This is accomplished without the need to remove the entire device 10. As an illustrated example, the biofeeder 10 is placed in a wastewater environment, such as a sewer pipe where its primary function is to dispense fluid, i.e. a biological solution, preferably a bacteria solution having one or more strains of bacteria, to the pipes, thereby providing a bacteria flora that helps increase the efficiency of the wastewater treatment plant and extend the life of existing infrastructure. The biofeeder 10 is designed to attach to existing structures within any environment. In the sewer pipes, the biofeeder device 10 may contain a securing bracket 140, see FIGS. 20 and 21, attached to the back surface 54 of the main dispensing unit 12.

The bracket 140 contains a first end 142 constructed and arranged to contain a first mechanism 144, illustrated as a generally u-shaped member, for attaching or hooking onto an existing structure within the environment, such as but not limited to a ladder rung 146. Such ladder rungs are typically located within sewers and are used to provide city workers a means of accessing the sewer system. A second end 148 contains a second mechanism 150, illustrated as a generally u-shaped member (the u-shape formed in the opposite direction as the first mechanism 144) for attaching or hooking onto adjacent or other ladder rungs 152. The second mechanism 150 is preferably spring loaded so that it may move in an upward direction, see arrow 154, or downward direction depending on the distance between adjacent ladder rungs in order to connect to ladder rungs that are not uniformly spaced apart.

Alternatively, the biofeeder 10 may be secured to the opening 155 of a sewer system manhole 156, see FIGS. 22-26. A crossbar 158 is placed into position so that each of the bars 160, 162, 164, and 166 rests within the manhole 156. Each of the bars contain an extender bar 168 which is slidably movable within a channel 170 in order to extend the length of each bar to fit variously sized manholes. An overhang portion 172 located at the end of the extender bar 168 rests on the surface 173 of the manhole 156 to provide secure attachment. One or more securing members, illustrated herein as cables 174, are attached to one or more portions of the crossbar 158 at one end and to one or more portions of the biofeeder device 10 at a second end. The cable 174 may be attachable to the biofeeder 10 through the handles 126 or O-rings, hooks, or eyelets 176 positioned at various places on the biofeeder 10 and/or crossbar 158. In this manner, the biofeeder device 10 is secured to the manhole 156 and hangs down into the sewer system.

Regardless of the mechanism of attachment to the sewer system, the biofeeder device 10 functions primarily to dispense predetermined amounts of the bacteria solution into a precise location within the sewer pipe at predetermined times. The bacteria solution 110 placed in the bag 108 and stored in the removable module 14 is fluidly connected to the pump 60 through tubing 68, see FIG. 28, and dispersed out using the tubing 70. The pump 60 is controlled by the on board microcomputer 64 which may also include an AVR microcontroller from Atmel Corporation. The solution 110 is preferably dispensed at a designated rate and at designated times. For example, the biofeeder device 10 may operate on diurnal cycles, having circuitry and a time clock to deliver various amounts of the microbe solution based on pre-determined factors, such as historical loads, time frames when wastewater generation is high/low, time periods within a 24 hour period, or seasonal time periods. Dispensing of the solution 110 can be programmed on board or remotely using a remote unit 178 having a receiver 180 and/or transmitter 182 to send information through a wireless link such as Bluetooth or cellular phone communication technology to a receiving and/or transmitting device 184 in communication with the microcomputer 64. Alternatively, the biofeeder device 10 can be adapted to use radio Frequency (RFID) or Near Field Communication (NFC) technology. In this manner, the biofeeder device 10 can communicate with an independent devices located externally or may be designed to communicate to one or more units placed within the wastewater system. A pressure sensor 186 may be connected to tube 68 (connected to fluid bag 66) to detect the weight of the solution as well as variations in pressure when the fluid is pumping. Using static pressure, the amount of fluid remaining in the bag can be detected and monitored. During dispense cycles, predetermined variations in pressure indicate that the pump 60 is working correctly. The pump 60 may include status indicators, green light 188 or red light 190, to visually indicate the pump's working status. Low levels of fluid can be relayed to the microcomputer 64 and sent wirelesses to the remote unit 178. The remote unit 178 is designed to be in communication with a main control computer 192 through wirelesses technology (main computer may have a transmitting/receiving device 194) or hardwired through the use of a USB port 196 and cable 198. The main control computer 192 maintains a database containing the locations of all the biofeeder devices 10 in a system, including its dispensing profiles as well as real time information. In this manner, all the biofeeder devices 10 can be monitored remotely so that when the fluid levels in the bags are depleted or there is a malfunction, individual units can be serviced.

Figure 27:
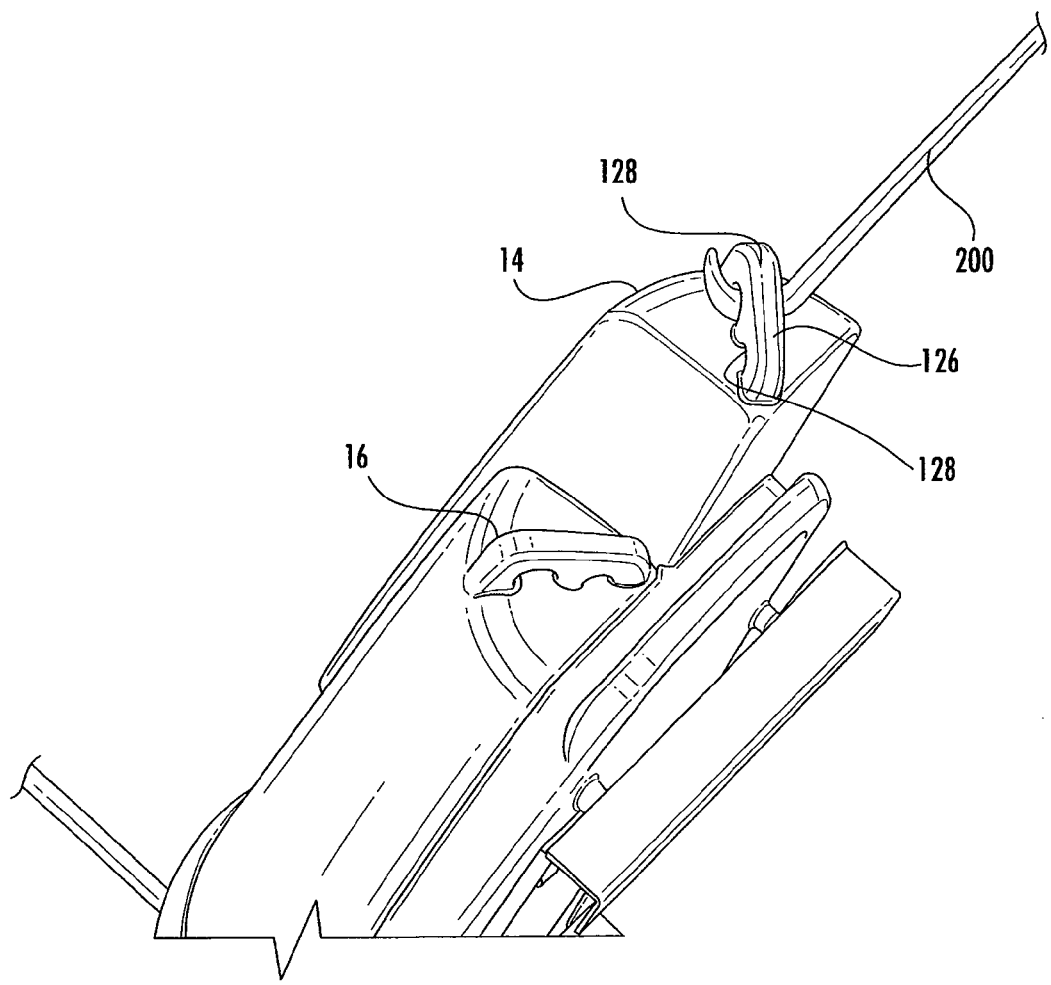
FIG. 27 illustrates removal of one of the modules.

The biofeeder device 10 is preferably powered using rechargeable batteries generating 12V to drive the pump 60. The battery voltage is monitored by an A/D input on the microcomputer 64. Battery level indicators are included to visually indicate if proper charge on the battery remains. Real time monitoring of the battery life can be kept through the use of a RTCIC. If the battery or the biological solution must be replaced, the user retrieves the removable module 14 or 16 from the base 20 by inserting a retrieving device 200, illustrated herein as a hook, see FIG. 27, within openings 128 of handle 126, and lifting in an upward direction. The batteries or fluid is replaced and the modules 14 or 16 are lowered back into the correct, secured position onto the base 20. In an alternative embodiment, the biofeeder 10 may contain one or more solar panels 202 which can be used to generate or be operatively connected to one or more components of the biofeeder device 10 to supply electricity to the device. As an illustrative example, the biofeeder device 10 would receive sunlight form one or more manholes within the wastewater system that are made of materials that allow sunlight to pass there through.

The present invention also contemplates the use of a plurality of biofeeder dispensing units within a wastewater treatment system to provide for a system for dispensing biological solutions into a wastewater system. Each of the biofeeder unit 10 may be in communication with one or more independently functioning biofeeder units within the system, as well as with one or more main computers which function to monitor and provide instructions for the entire system. By placing a plurality of biofeeder devices 10 within the system, a large area of the wastewater system can be controllably dispensed with one or more types of microbes or bacterial solutions. For example, one biofeeder device 10 may contain a bacterial solution having a single bacterial species. A second biofeeder device 10 within the system may have a bacterial solution with different species. For example, the system may include 5 biofeeder units 10 having Bacillus concentrations at high and low concentrations, 3 biofeeder units that dispense heavy grease bugs (HGB) to remove fats, oils, grease (FOG) concentration, and two biofeeder units 10 in specific locations dispensing different consortium of microbes for heavy load problems. Such system allows for delivery of microbes to different areas of the system based on residential, commercial, or industrial loading.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A device for dispensing biological solutions into a wastewater treatment system comprising:
    a biological dispensing unit for placement within a wastewater environment; said biological dispensing unit containing a base having a surface for supporting at least one removable module and a vertical support structure extending upwardly from said base, said vertical support structure having a generally planar inner surface and a first receiving member sized and shaped to receive at least a first portion of at least one removable module and to prevent lateral movement from said vertical support structure or said base, said base having at least one first securing member sized and shaped to couple with at least one second portion of said at least one removable module to prevent horizontal movement from said vertical support structure or said base;

said at least one removable module adapted to store a biological material therein and having at least one surface constructed and arranged to align with said vertical support structure inner surface, a second securing member sized and shaped to secure with said vertical support structure first receiving member, and a bottom surface having a second receiving member sized and shaped to receive said at least one first securing member positioned on said base; said at least one removable module being removeably coupled to said base unit and said vertical structure in a manner which prevents both lateral and vertical separation of said at least one removable module from said biological dispensing unit;

at least one biological material delivery unit comprising a pump operatively coupled to at least one dispensing tube adapted for dispensing at least a portion of said biological material stored within said at least one removable module to a wastewater treatment environment; and a control unit adapted for operatively controlling said biological dispensing unit.

2. The device for dispensing biological solutions into a wastewater treatment system according to claim 1 wherein said biological dispensing unit contains at least two removable modules.

3. The device for dispensing biological solutions into a wastewater treatment system according to claim 2 further including a power source, said power source being at least one battery stored within one of said at least two removable modules.

4. The device for dispensing biological solutions into a wastewater treatment system according to claim 1 further including a power source.

5. The device for dispensing biological solutions into a wastewater treatment system according to claim 1 wherein said at least one biological material delivery unit further comprises at least two dispensing tubes.

6. The device for dispensing biological solutions into a wastewater treatment system according to claim 1 wherein said control unit is programmed to deliver a predetermined concentration of a biological sample at a pre-determined rate.

7. The device for dispensing biological solutions into a wastewater treatment system according to claim 1 wherein said device for dispensing biological solutions into a wastewater treatment system is adapted to communicate to a independent device using wireless technology.

8. The device for dispensing biological solutions into a wastewater treatment system according to claim 7 wherein said wireless technology is Bluetooth technology.

9. The device for dispensing biological solutions into a wastewater treatment system according to claim 1 wherein said biological material contains one or more microbes.

10. The device for dispensing biological solutions into a wastewater treatment system according to claim 9 wherein said biological material contains microbes from the same species.

11. The device for dispensing biological solutions into a wastewater treatment system according to claim 9 wherein said biological material contains microbes from the at least two different species.

12. The device for dispensing biological solutions into a wastewater treatment system according to claim 1 wherein said biological dispensing unit is programmed to dispense said biological materials based on one or more factors.

13. The device for dispensing biological solutions into a wastewater treatment system according to claim 12 wherein said biological dispensing unit is programmed to dispense said biological materials based on diurnal cycles.

14. The device for dispensing biological solutions into a wastewater treatment system according to claim 12 wherein said biological dispensing unit is programmed to dispense said biological materials based on seasonal changes.

15. The device for dispensing biological solutions into a wastewater treatment system according to claim 1 wherein said biological dispensing unit contains at least one solar panel.

16. The device for dispensing biological solutions into a wastewater treatment system according to claim 1 wherein said at least one removable module adapted to store a biological material therein contains a gripping structure.

17. The device for dispensing biological solutions into a wastewater treatment system according to claim 1 further adapted to secure to a portion of the environment of said wastewater.

18. The device for dispensing biological solutions into a wastewater treatment system according to claim 1 further including spring loaded bracket for removeably attaching to two spaced apart ladder rungs, said spring loaded bracket having a first fixed end configured to secure to a portion of said first ladder rung and a second movable end configured to secure to said second ladder rung.

19. The device for dispensing biological solutions into a wastewater treatment system according to claim 1 further including a securing device for securing said device to a surface of a manhole, said securing device having:

at least one elongated member having a first end and an opposing second end;

a first extender member slidably engaged to said at least one elongated member and having an overhang portion positioned at one end, said overhang configured to rest on said surface of said manhole; and a second extender member slidably engaged to said at least one elongated member and having an overhang portion positioned at one end, said overhang configured to rest on said surface of said manhole.

20. The device for dispensing biological solutions into a wastewater treatment system according to claim 19 wherein said securing device includes two intersecting elongated members forming a cross-like configuration.

21. A system for dispensing biological solutions into a wastewater treatment system comprising:

a plurality of biological dispensing units for placement within a wastewater environment; each said biological dispensing unit containing a base and a vertical support structure extending upwardly from said base, said vertical support structure having a generally planar inner surface and a first receiving member sized and shaped to receive at least a first portion of at least one removable module and to prevent lateral movement from said vertical support structure or said base, said base having at least one first securing member sized and shaped to couple with at least one second portion of said at least one removable module to prevent horizontal movement from said vertical support structure or said base; at least one removable module adapted to store a biological material therein and having at least one surface constructed and arranged to align with said vertical support structure inner surface, a second securing member sized and shaped to secure with said vertical support structure first receiving member, and a bottom surface having a second receiving member sized and shaped to receive said at least one first securing member positioned on said base, said at least one removable module being removeably coupled to said base unit and said vertical structure in a manner which prevents both lateral and vertical separation of said at least one removable module from said biological dispensing unit; at least one biological material delivery unit adapted for dispensing at least a portion of said biological material stored within said at least one removable modules; and a main control unit adapted for operatively controlling said biological dispensing unit;

whereby said plurality of biological dispensing units are placed within said wastewater environment at predetermined locations.

22. The system for dispensing biological solutions into a wastewater treatment system according to claim 21 wherein said system comprises at least two biological dispensing units, each said dispensing unit positioned at a predetermined space within said wastewater treatment system.

23. The system for dispensing biological solutions into a wastewater treatment system according to claim 22 wherein each said biological dispensing unit is wirelessly connected to at least one other said biological dispensing unit.

24. The system for dispensing biological solutions into a wastewater treatment system according to claim 23 wherein each said biological dispensing unit contains differing biological materials.

* * * * *